E. A. TUTTLE.
Hot-Air Register and Ventilator.
No. 1234
Reissued Nov. 12, 1861
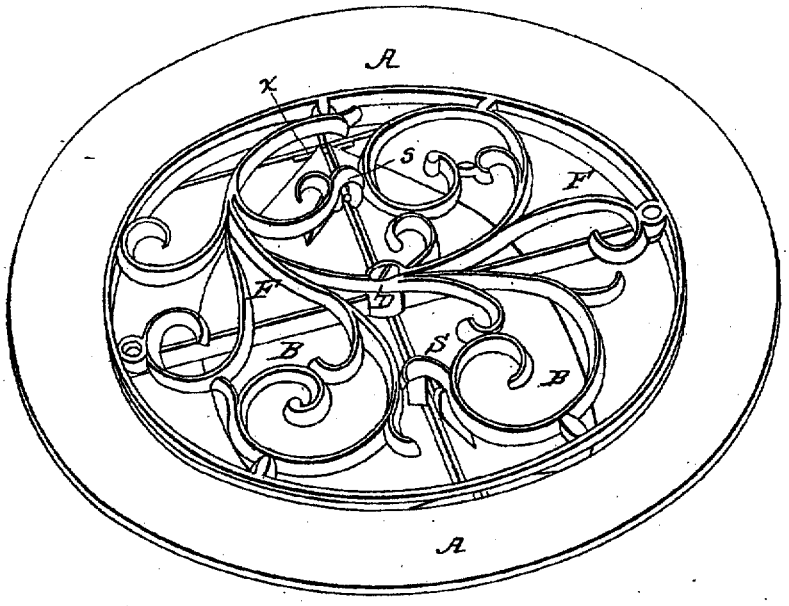
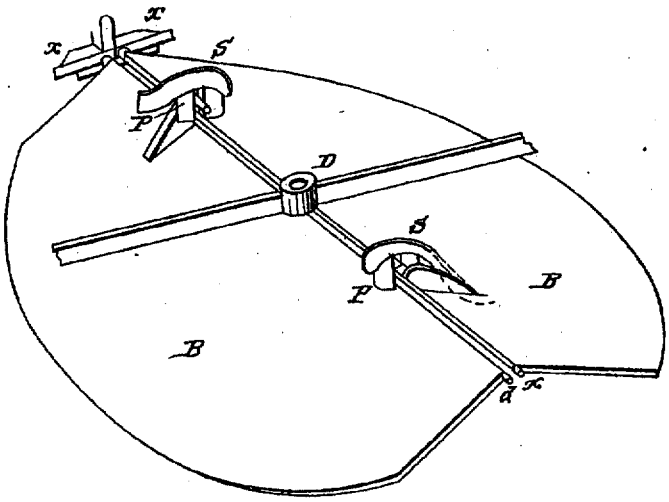
N. PETERS, Photo-Lithographer, Washington, D. C.

UNITED STATES PATENT OFFICE.

EDWARD A. TUTTLE, OF BROOKLYN, NEW YORK.

IMPROVEMENT IN REGISTERS AND VENTILATORS.

Specification forming part of Letters Patent No. 15,093, dated June 10, 1856; Reissue No. 1,234, dated November 12, 1861.

*To all whom it may concern:*

Be it known that I, EDWARD A. TUTTLE, of Brooklyn, E. D., in the county of Kings and State of New York, have invented a new and useful Improvement in Warm-Air Registers and Ventilators; and I do hereby declare that the following is a full, clear, and exact description of the same, reference being had to the annexed drawings, making a part of this specification, in which—

Figure 1 is a perspective view of my invention; Fig. 2, a detached perspective view of the valves.

Similar letters of reference indicate corresponding parts in the two figures.

Two species of ventilators or registers are at present in common use. One kind is known as the "double-plate" register, and is composed of two plates laid one upon the other, and so combined that by sliding one of the plates over the surface of the other the register will be either opened or closed, as desired; the perforations of one plate being covered by the unperforated parts of the remaining plate, and the register being thus closed; or the perforations of both plates being brought into line or agreement, the register will be opened. These double-plate registers are objectionable, because if made of the same size as the delivery air-pipe they reduce the capacity of delivery just fifty per cent., because the openings or perforations of the plates can never exceed in size the dimensions of the unperforated or solid portions, which occupy one-half the area of the register-opening. Again, the double-plate registers are not capable of extensive ornamentation, because the perforations must be comparatively large, otherwise the capacity for delivery will be still further reduced. These wide perforations cause an unevenness in the surface, and also reduce their strength, and thus render their use objectionable upon floors, while they are wanting in neatness for side walls. The other kind or class of registers is composed of a single fixed ornamental front plate, having movable valves arranged behind it. A series of jointed links connect the valves with a small rotary connecting-rod, which extends from the valves through the center of the front plate, where it terminates in a suitable knob or wheel, by turning which the valves are opened or closed, as may be desired.

My improvement pertains to the above class of single-plate ventilators.

To enable those skilled in the art to make and use my invention, I will proceed to describe its construction and operation.

I construct my ventilator of any desirable shape—round, square, or otherwise. It consists of three parts—namely, the rim or frame A A, (see drawings,) the vibrating front F F, and the valves B B, which are suspended in the frame A A in any usual manner, allowing them to turn freely upon their axes.

Upon or in front of the valves I suspend the vibrating scroll or front piece, F F, having its axis at or near the center of the open front of the ventilator. From the back side of this vibrating or revolving front, a suitable distance from its center D, I project forks or pins S S, which operate upon the projections P P, raised upon the valves near the line of their axis, substantially as shown. By turning the vibrating front the projections S S and P P, which are constantly in contact, operate upon each other and throw open the valves.

My improvement is intended chiefly to be used as a ventilator in the side walls of dwellings, and many times above reach, in which case I attach cords to opposite sides of the vibrating front piece, by which it is operated.

The improvements attained by my invention are, first, simplicity of construction, the vibrating front and valves operating in contact by means of cast or fast projections upon each, thus dispensing with any intermediate parts, such as connecting-rods, levers, links, or other contrivances now used in the construction of ventilators, &c.; second, by reason of its simplicity a great reduction in the cost of the ventilator; third, an improvement in appearance of ventilators, in dispensing with the projecting cross-piece or levers usually placed upon or across the face of the ventilator, and to which cords are attached. In very large or square-shaped ventilators only a part of the front of the ventilator is made to revolve or move, which movable portion is made to operate the valves in the manner before described.

I do not claim, broadly, the use of slots and pins as a device for opening the valves of ventilators or registers, nor do I claim, broadly, the invention of registers that have movable front or top plates; but What I do claim as new, and desire to secure by Letters Patent, is—

The construction of the valves and plates with pins or projections, arranged to operate together, substantially as herein shown and described, without the use of any intervening parts or pieces, as set forth.

EDWARD A. TUTTLE.

Witnesses:

JAMES LAIRD,

LEWIS A. TUCKER.